(12) United States Patent
Noda

(10) Patent No.: US 9,405,901 B2
(45) Date of Patent: Aug. 2, 2016

(54) IMAGE PROCESSING SYSTEM AND LOG STORAGE METHOD

(71) Applicant: KYOCERA Document Solutions Inc., Osaka (JP)

(72) Inventor: Tatsuo Noda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/581,533

(22) Filed: Dec. 23, 2014

(65) Prior Publication Data

US 2015/0186670 A1    Jul. 2, 2015

(30) Foreign Application Priority Data

Dec. 27, 2013 (JP) ................................. 2013-271844
Dec. 27, 2013 (JP) ................................. 2013-271851

(51) Int. Cl.
*G06F 11/30* (2006.01)
*G06F 12/14* (2006.01)
*G06F 21/55* (2013.01)

(52) U.S. Cl.
CPC ................................... *G06F 21/552* (2013.01)

(58) Field of Classification Search
CPC ..................................................... G06F 21/552
USPC ......................................................... 713/193
See application file for complete search history.

(56) References Cited

U.S. PATENT DOCUMENTS

| 2006/0020805 A1* | 1/2006 | Osaka | H04N 1/00464 713/176 |
| 2007/0074028 A1* | 3/2007 | Makishima | H04L 9/3263 713/176 |
| 2009/0089592 A1* | 4/2009 | Kudo | H04L 9/3236 713/193 |
| 2009/0193524 A1* | 7/2009 | Shoji | G06F 21/10 726/27 |
| 2010/0161977 A1* | 6/2010 | Taylor | G06F 21/10 713/165 |
| 2014/0129847 A1* | 5/2014 | Lee | G06F 21/10 713/193 |

FOREIGN PATENT DOCUMENTS

JP    2011-104796 A    6/2011

OTHER PUBLICATIONS

Paul B; Persistent Access Control to Prevent Piracy of Digital Information; IEEE-1999; p. 1239-1250.*

* cited by examiner

*Primary Examiner* — Monjour Rahim
(74) *Attorney, Agent, or Firm* — Stein IP, LLC

(57) ABSTRACT

The terminal device include the file creation unit for storing a file including a public key in the external storage medium when the terminal device is connected with the external storage medium, and the decryption unit for decrypting the encrypted log using a secret key corresponding to the public key when the terminal is reconnected with the external storage medium storing the encrypted log. The image processing apparatus includes the encryption unit for encrypting a log using the public key stored in the file of the external storage medium, and storing the encrypted log in the external storage medium, when the image processing apparatus is connected with the external storage medium storing the file.

8 Claims, 10 Drawing Sheets

IMAGE PROCESSING SYSTEM AND LOG STORAGE METHOD

INCORPORATION BY REFERENCE

This application claims the benefit of priority to Japanese Patent Application No. 2013-271851 filed on Dec. 27, 2013, and No. 2013-271844 filed on Dec. 27, 2013, the entire contents of which are incorporated by reference herein.

BACKGROUND OF THE INVENTION

The present disclosure relates to an image processing system and a log storage method.

When some trouble occurs in the image forming apparatus like the copying machine, there has been a case where internal information (log) or image data in the image forming apparatus are taken out to an external movable memory in order to analyze causes of the trouble.

There is a possibility that the internal information to be taken out includes confidential information of user, and the image data itself are the confidential information. Since the external memory is configured to be movable and easily attachable and detachable by unspecified large number of person, the data security should be considered when the internal information and image data are taken out from the image forming apparatus.

One of the conventional image forming apparatus is configured to include a memory made of a nonvolatile memory and an external I/F attachable and detachable to/from an external storage medium. The apparatus further includes a control unit for determining whether the log recording the internal information of the apparatus and the image data are stored in the external storage medium or the memory. The control unit does not encrypt the log and image data when they are stored in the memory, but encrypts them when they are stored in the external storage medium. Such recording method includes a step of determining whether the log and image data are stored in the nonvolatile memory or the external storage medium attachable and detachable to/from the external I/F, and a step of encrypting the log and the image data when they are stored in the external storage medium but not encrypting the log and the image data when they are stored in the nonvolatile memory. According to such configuration, it is possible to assure the data security when the internal information and image data are taken out from the apparatus.

In the above-mentioned technique, however, since the encrypted information can be copied freely to the external storage medium and the password to decrypt the encrypted information is memorized by a user or a service person, it is a possibility that the encrypted log and customer information leaks out carelessly and there is a need to manage the passwords carefully.

In particular, the above-mentioned log and image data always includes personal information of user or customer using the image forming apparatus, such as the facsimile number, the mail address, and so on. If such log data are decrypted illegally by any means, it becomes a big problem with respect to the security control.

There is the other method wherein the image forming apparatus stores the log only in a specific external storage medium using identification information (unique information) imparted to the external storage medium. In such method, only the specific external storage medium can store the log of the image forming apparatus. Therefore, the method is desirable with respect to the security control, but it is required that the identification information of the external storage medium has been registered on the image forming apparatus in advance. When the service person has lost the specific external storage medium, it is hard to use a new external storage medium substitute for the specific external storage medium.

SUMMARY OF THE INVENTION

In accordance with an aspect of the present disclosure, an image processing system in the present disclosure includes a terminal device and an image processing apparatus that are connected and communicated with an external storage medium respectively. The terminal device includes a file creation unit and a decryption unit. The image processing apparatus includes an encryption unit. The file creation unit, in the terminal device, operable to store a file including a public key in the external storage medium, when the terminal device is connected with the external storage medium. The encryption unit, in the image processing apparatus, operable to encrypt a log using the public key stored in the file of the external storage medium, and store the encrypted log in the external storage medium, when the image processing apparatus is connected with the external storage medium storing the file. The decryption unit, in the terminal device, operable to decrypt the encrypted log using a secret key corresponding to the public key, when the terminal is reconnected with the external storage medium storing the encrypted log.

In accordance with another aspect of the present disclosure, an image processing system in the present disclosure includes a terminal device and an image processing apparatus that are connected and communicated with an external storage medium respectively. The terminal device includes a file creation unit and a decryption unit. The image processing apparatus includes an identification information determination unit and an encryption unit. The file creation unit, in the terminal device, operable to store a file including registered identification information in the external storage medium, and creates a table including the identified information, when the terminal device is connected with the external storage medium. The identification information determination unit, in the image processing apparatus, operable to determine whether or not the identification information of the external storage medium is identical with the identification information stored in the file, when the image processing apparatus is connected with the external storage medium storing the file. The encryption unit, in the image processing apparatus, operable to encrypt log when the identification information of the external storage medium is identical with the identification information stored in the file upon receipt of the determination result, and store the encrypted log in the external storage medium. The a decryption unit, in the terminal device, operable to determine the identification information of the external storage medium is identical with the identification information in the table, when the terminal device is reconnected with the external storage medium storing the encrypted log, and then decrypt the encrypted log.

In accordance with another aspect of the present disclosure, a log storage method for an image processing system includes steps of a file creation step, an encryption step and a decryption step. The file creation step stores a file including a public key in the external storage medium, when the terminal device is connected with the external storage medium. The encryption step a log using the public key stored in the file of the external storage medium, and storing the encrypted log in the external storage medium, when the image processing apparatus is connected with the external storage medium storing the file. The encryption step encrypts decrypting the encrypted log using a secret key corresponding to the public key, when the terminal device is reconnected with the external storage medium storing the encrypted log. The decryption step decrypts the encrypted log using a secret key corresponding to the public key, when the terminal device is reconnected with the external storage medium storing the encrypted log.

In accordance with another aspect of the present disclosure, a log storage method for an image processing system includes a file storing step, an identification information determination step, an encryption step, and a decryption step. The file storing step stores a file including identification information registered in the external storage medium in the external storage medium, when the terminal device is connected with the external storage medium. The identification information determination step determines whether or not the identification information of the external storage medium is identical with the identification information in the file, when the external storage medium is connected with the image processing apparatus. The encryption step encrypts a log and storing the encrypted log in the external storage medium, when identification information of the external storage medium is identical with the identification information in the file. The decrypting step determines the identification information of the external storage medium is identical with the identification information in the table, when the terminal device is reconnected with the external storage medium storing the encrypted log, and then decrypting the encrypted log.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

According to attached drawings, the embodiments of the image processing system in the present disclosure are explained hereinafter in order to understand the present disclosure. Besides, the following embodiments are only examples that realize the present disclosure, and do not limit the technical scope of the present disclosure. Additionally, in the flowchart, the alphabet "S" in front of a numeral means a "step".

<Image Processing System>

The image processing system including an image processing apparatus and a terminal device is explained below as the image processing system in accordance with the embodiments of the present disclosure. The parts that do not have direct relation to the present disclosure are explained briefly, and the detailed explanation is omitted. The image processing apparatus in the present disclosure corresponds to a multi-function peripheral provided with functions of a copying machine, a scanner and a printer. The multifunction peripheral functions as the image processing apparatus provided with a copying function, a scanner function and a printer function.

When a user uses the copying function, the working of the multifunction peripheral 100 (MFP) is explained hereinafter briefly.

Figure 1:
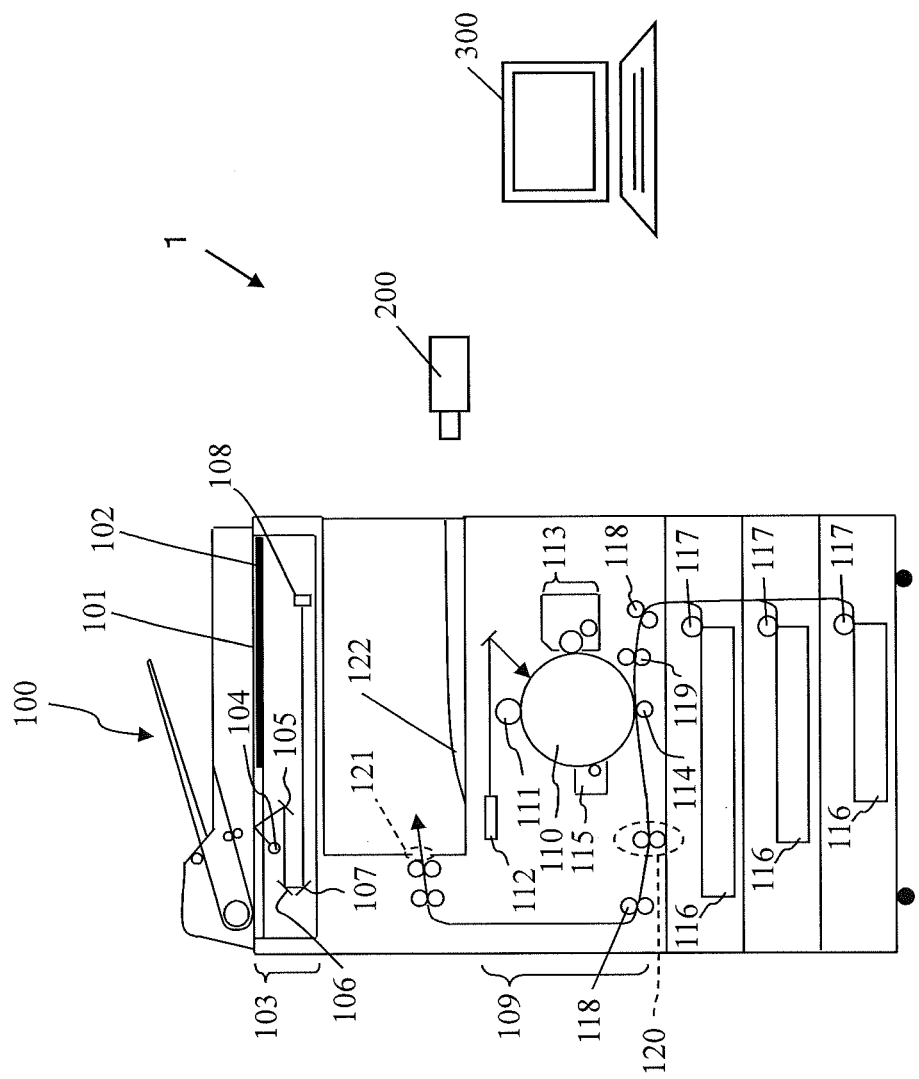
FIG. 1 is a schematic diagram of image processing system in accordance with an embodiment of the present disclosure.

As shown in FIG. 1, when the user uses the multifunction peripheral 100, the user puts an original P on an original plate 101 on a top of housing. And the user inputs the setting conditions of the image processing from an operation screen of an operation unit 102 (an operation panel) nearby the original plate 101. In addition, the user presses down a start key on the operation unit 102, whereby the multifunction peripheral 100 starts the image processing (the copying function: the printing processing)

Next, the light emitted from a light source 104 is reflected on the original placed on the original plate 101. The reflected light is guided to an imaging element 108 by mirrors 105, 106 and 107. After the guided light is photo-electrically converted, image data corresponding to the original is formed.

A unit for forming a toner image according to the image data is an image forming unit 109. The image forming unit 109 is provided with a photosensitive drum 110. The photosensitive drum 110 rotates in a predetermined direction at a fixed speed. A charging unit 111, an exposing unit 112, a developing unit 113, a transfer unit 114, and a cleaning unit 115 are arranged around the photosensitive drum 110 in order from the upstream side of the rotation direction The charging unit 111 electrifies a surface of the photosensitive drum 110 uniformly. The exposing unit 112 irradiates the laser on the surface of the electrified photosensitive drum 110 based on the image data and forms an electrostatic latent image. The developing unit 113 sticks the toner on the formed electrostatic latent image, and forms a toner image. The formed toner image is transferred to a storage medium (e.g. a paper or a sheet) by the transfer unit 114. The cleaning unit 115 removes excessive toners remained on the surface of the photosensitive drum 110. The series of processing is executed whenever the photosensitive drum rotates.

The sheet is supplied from one of a polarity of sheet feed cassettes 116 provided to the multifunction peripheral 100. When the sheet is conveyed, the sheet is pulled out from one of the sheet feed cassettes 116 to a conveyance path by a pickup roller 117. Each sheet feed cassette 116 houses a different kind of sheet, respectively. The sheet is supplied based on the setting conditions for the image processing.

The sheet pulled out to the conveyance path is sent between the photosensitive drum 110 and the transfer unit 114 by a conveyance roller 118 and a resist roller 119. On the conveyed sheet, the toner image is transferred by the transfer unit 114, and then the sheet is conveyed to a fixing unit 120.

When the sheet on which the toner image is transferred is passing between a heat roller and a pressure roller, which are provided to the fixing unit 120, a visible image is fixed on the sheet by applying the heat and pressure on the toner image. The quantity of heat of the heat roller is predetermined optimally depending on the kind of sheet, and the fixing is executed appropriately. When the visible image is fixed on the sheet, the image forming process is finished. The sheet is ejected to a tray 122 built in the housing through a sheet exit 121 by the conveyance roller 118. The sheet is loaded on and stored in the built-in tray 122. The multifunction peripheral 100 can give the user the copying function by the above steps.

Here, when the multifunction peripheral 100 executes the copying function, the internal information indicating the execution of the copying is stored in a predetermined internal storage medium as a log. The internal storage medium always stores the log of the processing executed by the multifunction peripheral 100.

For instance, the user like the service person connects an external storage medium 200 (e.g. USB memory) with a terminal device 300, and registers the external storage medium 200 on the terminal device 300. After that, the user connects the external storage medium 200 with the multifunction peripheral 100, and stores the log of the multifunction peripheral 100 in the external storage medium 200. And then, when the user connects the external storage medium 200 with the terminal device 300 again, the log stored in the external storage medium 200 is stored in a specific storage medium of the terminal device 300, and the storage (moving) of the log is finished. (The details will be explained later.)

Figure 2:
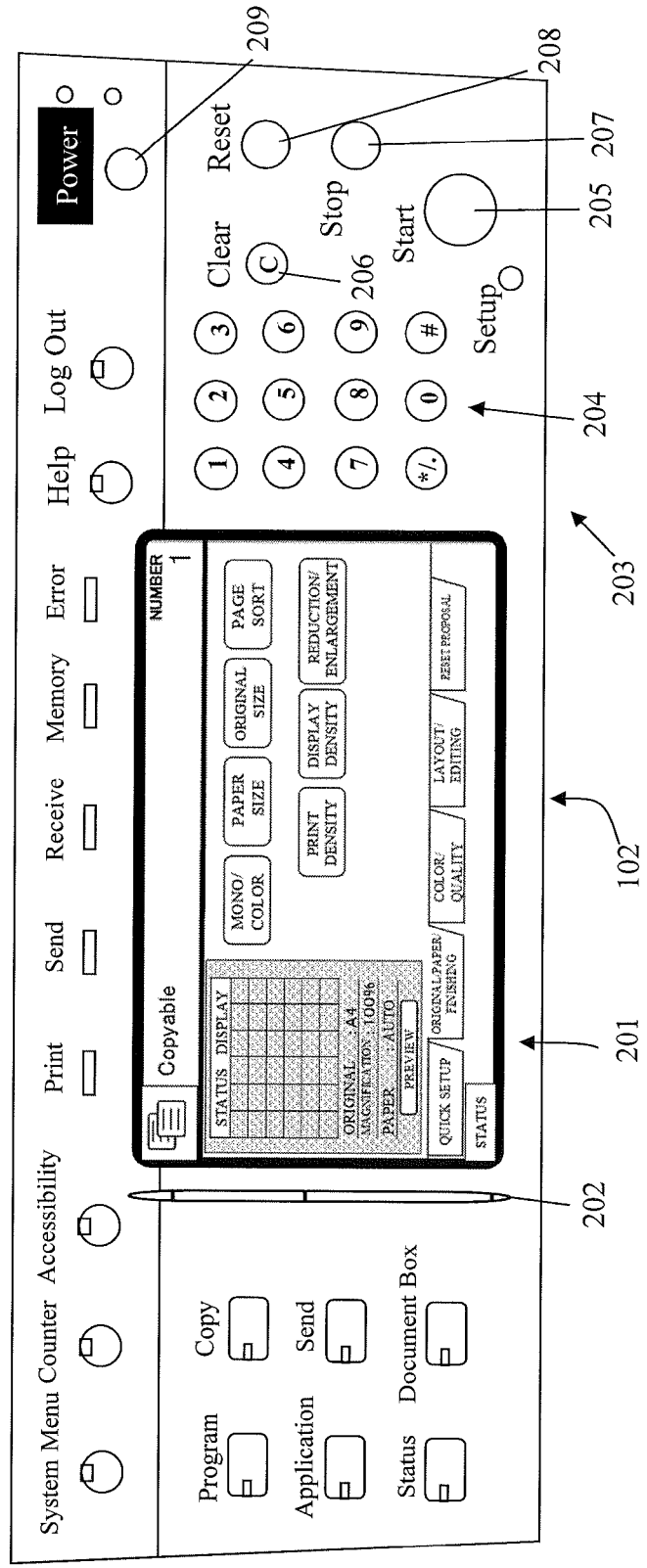
FIG. 2 is a conceptual diagram indicating a whole structure of an operation unit in accordance with an embodiment of the present disclosure.

As shown in FIG. 2, the user inputs the setting conditions of the image processing with respect to the above image processing and confirms the inputted setting conditions by means of the operation unit 102. At inputting the setting condition, the user uses a touch panel 201 (an operation panel), a touch pen 202, and an operation key 203 that are provided to the operation unit 102.

The touch panel 201 includes both the setting condition input function and the setting condition displaying function. That is, when the user presses down the key on the screen displayed on the touch panel 201, the setting condition corresponding to the pressed key is inputted.

A display unit (not shown) such as LCD (Liquid Crystal Display) is provided on a back of the touch panel 201. The display unit displays an operation screen, such as an initial screen, for example. A touch pen 202 is provided nearby the touch panel 201. When the user contacts the touch panel 201 with a tip of the touch pen 202, a sensor under the touch panel 201 detects the contact of the tip.

Nearby the touch panel 201, a specific number of operation keys 203 are arranged, such as a ten key 204, a start key 205, a clear key 206, a stop key 207, a reset key 208, and a power key 209, for example.

Figure 3:
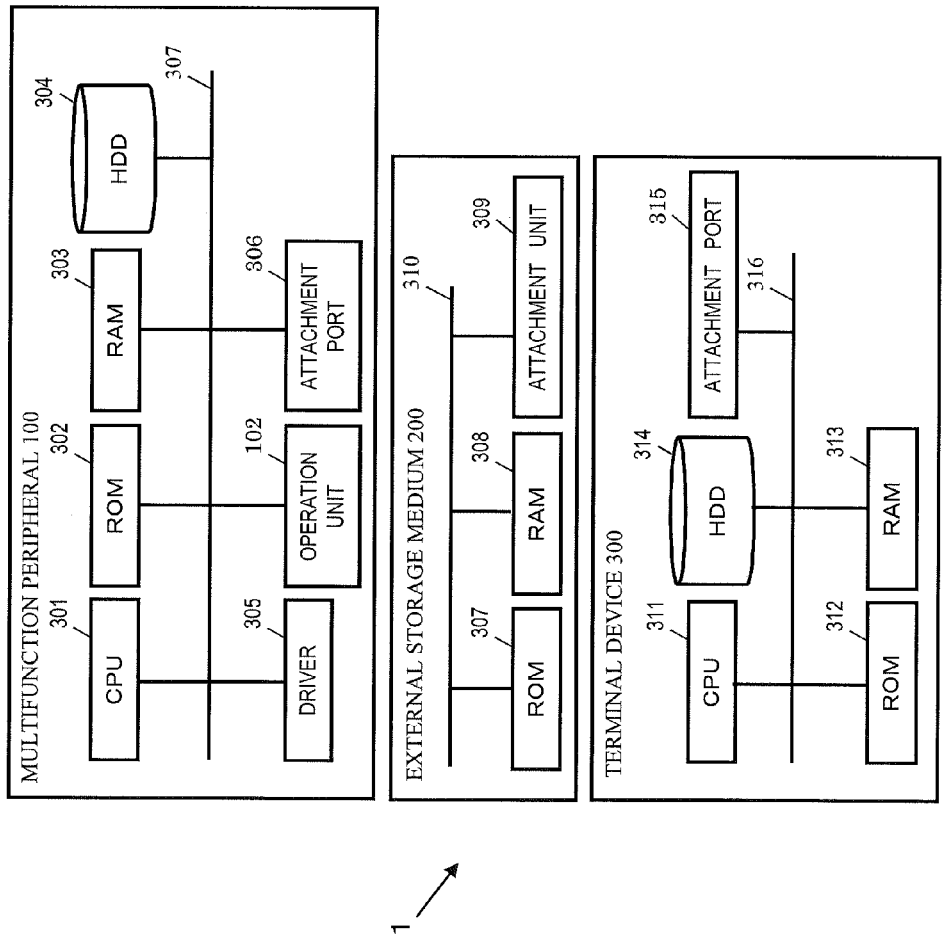
FIG. 3 is a diagram indicating a structure of control system hardware of the image processing system in accordance with an embodiment of the present disclosure.

According to FIG. 3, a structure of the control system hardware of the multifunction peripheral 100 is explained here. The parts that do not have direct relation to the present disclosure are explained briefly, and the detailed explanation is omitted.

A control circuit of the multifunction peripheral 100 of the image processing system 1 is configured to connect CPU (Central Processing Unit) 301, ROM (Read Only Memory) 302, RAM (Random Access Memory) 303, HDD (Hard Disk Drive) 304, a driver 305 corresponding to each driving unit, an operation unit 102, and an attachment port 306 of the external storage medium 200 through an internal bus 307.

CPU 301 uses RAM 303 as a working area, for example, and executes programs stored in ROM 302 and HDD 304. CPU 301 receives and sends data, instructions, signals, and commands from the driver 305, the operation unit 102, or the external storage medium 200 connected with the attachment port 306 according to the execution result, and controls the operation of each driving unit shown in FIG. 1.

A control circuit of the external storage medium 200 of the image processing system 1 connects ROM 307, RAM 308, and an attachment unit 309 through an internal bus 310, and stores the programs and data of the terminal device 300 and the log of the multifunction peripheral 100.

A control circuit of the terminal device 300 of the image processing system 1 connects CPU 311, ROM 312, RAM 313, HDD 314 and an attachment port 315 for the external storage medium through an internal bus 316. The functions of each member are the same as above.

The respective units (shown in FIG. 4 and FIG. 7) described later except the driving unit are materialized by executing each program by CPU 301 of the multifunction peripheral 100 and CPU 311 of the terminal device 300. ROM 302, RAM 303 and HDD 304 of the multifunction peripheral 100, ROM 302 and RAM 303 of the external storage medium 200, and ROM 3012, RAM 313 and HDD 314 of the terminal device 300 store the program and data for materializing the under-mentioned units.

First Embodiment of the Present Disclosure

Figure 4:
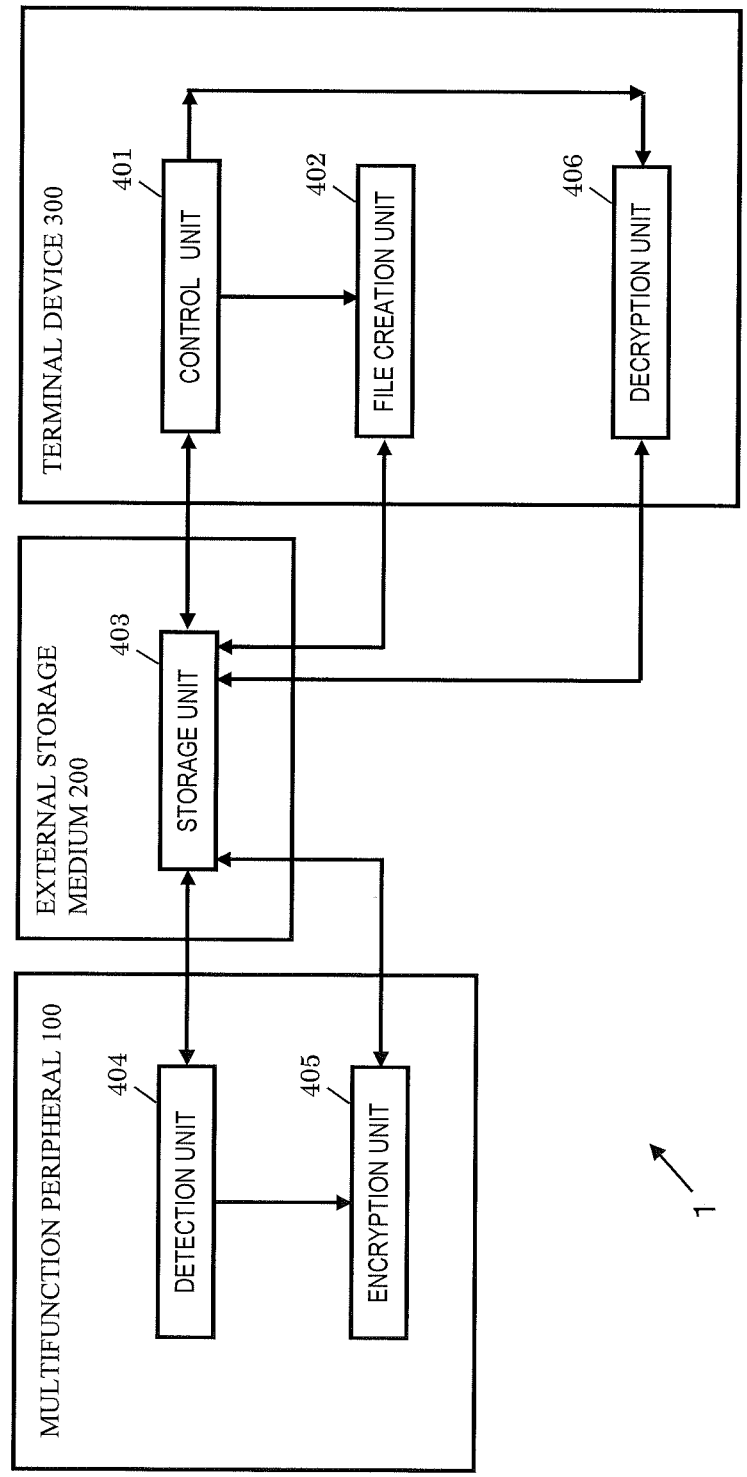
FIG. 4 is a functional block diagram of the image processing system in accordance with first embodiment of the present disclosure.

The structure and execution procedure in first embodiment of the present disclosure are explained with reference to FIG. 4 and FIG. 5.

Figure 5:
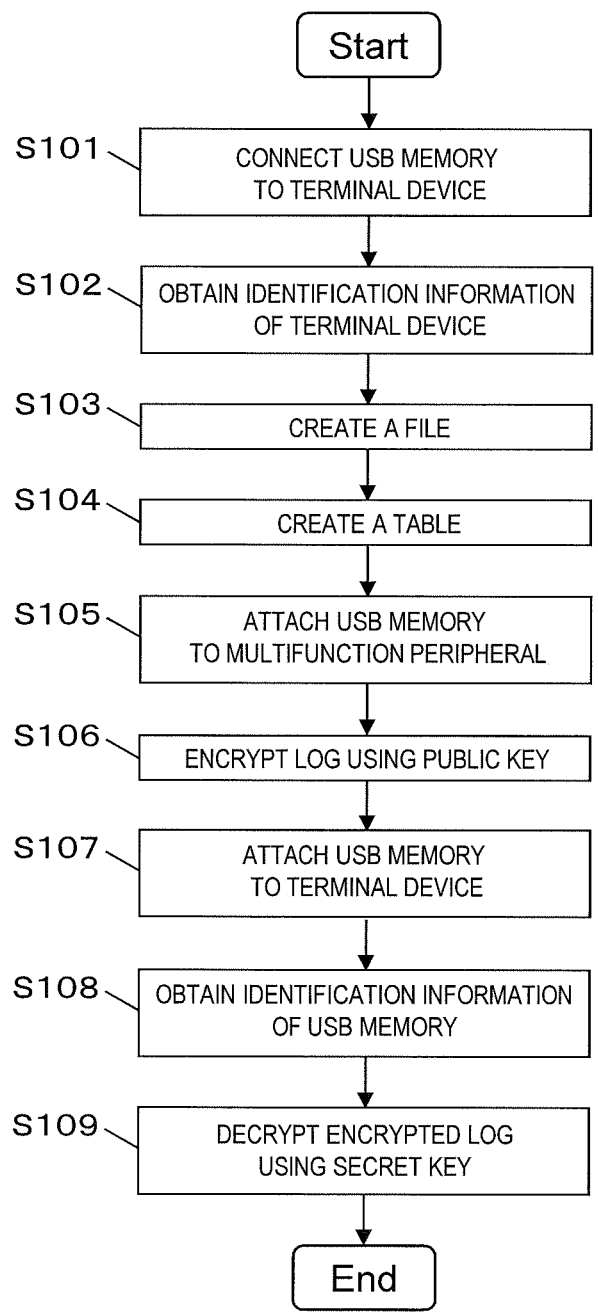
FIG. 5 is a flowchart indicating execution steps in accordance with first embodiment of the present disclosure.

The user connects a specific external storage medium 200 (USB memory) with the terminal device 300 located at a specific company, such as a head office or a development company, so as to communicate each other (FIG. 5: S101).

The connecting method for making sure the communication between the terminal device 300 and the external storage medium 200 is not limited in particular. For instance, the user may visit the specific company and connect the attachment unit 309 of the external storage medium 200 with the attachment port 315 of the terminal device 300. Otherwise, the user may connect the attachment unit 309 of the external storage medium with the attachment port of the user's terminal device that is connected with the terminal device 300 through the network.

When the user connects the external storage medium 200 with the terminal device 300, the external storage medium 200 is required to be physically contacted to the terminal device 300. When the user connects the external storage medium 200 with the terminal device 300 through the user's terminal device, the external storage medium 200 is not required to be physically connected with the terminal device 300. In this case, even if the user's location is far away from the specific company, a new external storage medium 200 for storing the log can be implemented easily and safely.

Figure 6:
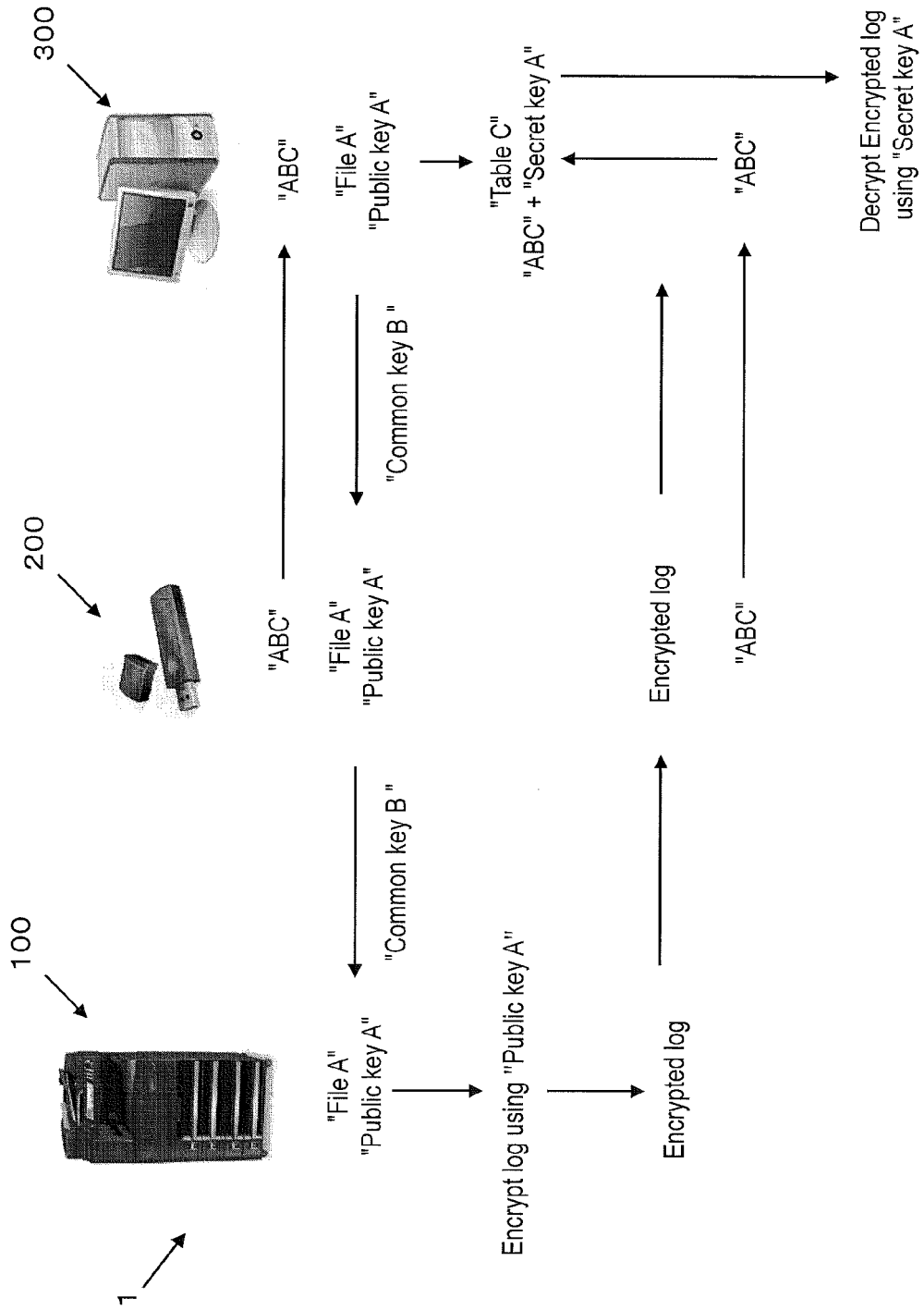
FIG. 6 is a conceptual diagram indicating data transaction of the image processing system in accordance with first embodiment of the present disclosure.

When the terminal device 300 is connected with the external storage medium so as to communicate each other, a control unit 401 of the terminal device 300 detects the communication connection of the external storage medium 200, and notifies a file creation unit 402 of the connection. Upon receipt of the notice, the file creation unit 402 obtains identification information (e.g., "ABC") that was previously registered in the external storage medium 200, as shown in FIG. 6 (FIG. 5: S102).

The identification information of the external storage medium 200 is a serial number, a production number, an individual number, maker name, or a model number, which can uniquely identify the external storage medium 200.

The method of obtaining the identification information of the external storage medium 200 by the file creation unit 402 is not limited in particular. For instance, when the external storage medium 200 is physically connected with the external device 300, the file creation unit 402 obtains the identification information directly from the external storage medium 200. Otherwise, when the external storage medium 200 is not physically connected with the external device 300, namely, when the external storage medium 200 is connected with the terminal device 300 via network and the user's terminal device, the file creation unit 402 obtains the identification information from the external storage medium 200 via the user's terminal device and network. In addition, software may be created to obtain the identification. By means of the software, the user may fetch out the identification information of the external storage medium 200 from the external storage medium 200 at some place, and then input the fetched information to the terminal device 300 manually.

When the file creation unit 402 obtains the identification information ("ABC"), the file creation unit 402 creates a file ("File A") including a public key ("Public key A"), and stores the file ("File A") in a storage unit 403 of the external storage medium 200 (FIG. 5: S103).

The public key may be a key created in advance by the terminal device 300 or a one-time key created at connecting the external storage medium 200, like a one-time password. In case of the one-time key, the data security can be ensured definitely.

The created file is not limited in particular, but it is desired to include the public key. The file may include a simple table, or a file included a program for the processing described later.

When the file creation unit 402 stores the file ("File A") in the storage unit 403 of the external storage medium 200, the file is encrypted using a common key ("Common key B") shared by both the terminal device 300 and the multifunction peripheral 100. The encrypted file is stored in the storage unit 403 of the external storage medium 200. Hereby, the data security can be more improved.

After creating and storing the file, the file creation unit 402 creates a table ("Table C") wherein a secret key ("Secret key A") corresponding to the public key in the file is associated with the identification information ("ABC"), and then stores the table in the predetermined memory in the terminal device 300 (FIG. 5: S104). At this time, the table is not limited in particular, but it may associate the identification information with the secret key. The table may be a simple form, or may include a program for the processing described later.

As described above, the specific file ("File A") is stored in the external storage medium 200, and the specific table ("Table C") is stored in the terminal device 300. Hereby, the external storage medium 200 is ready for storing the log.

When the user detaches the external storage medium 200 from the terminal device 300 or the user's terminal device, the communication between the external storage medium 200 and the terminal device 300 is disconnected. The user brings the external storage medium 200 to the location of the multifunction peripheral 100, and connects the attachment unit 309 of the external storage medium 200 with the attachment port 306 of the multifunction peripheral 100. At this time, the detection unit 404 of the multifunction peripheral 100 detects the attachment of the external storage medium 200 (FIG. 5: S105), and notifies an encryption unit 405 of the attachment. Upon receipt of the notice, the encryption unit 405 confirms that the file is stored in a storage unit 403 of the external storage medium 200 and encrypts the log of the multifunction peripheral 100 using the public key ("Public key A") in the file. The encryption unit 405 stores the encrypted log in the recording unit 403 of the external storage medium 200 (FIG. 5: S106).

When the file is encrypted by the common key ("Common key B"), the encryption unit 405 decrypts the file using the common key registered in advance in the multifunction peripheral 100 and obtains the public key ("Public key A") from the File. After that, the encryption is executed.

Besides, the log includes information of the multifunction peripheral 100, such as process information, failure information, internal information, bug information, customer information, the facsimile number, and the e-mail address, and so on.

As described above, the log is encrypted using the public key. Even when it occurs that the user loses the external storage medium 200 storing the encrypted log on the way to the location of the terminal device 300 and the other user finds the external storage medium 200 to decrypt the encrypted log therein, the other user cannot decrypt the data without the secret key in the external storage medium 200. Accordingly, if the user loses the external storage medium 200, the data security can be ensured.

The user detaches the external storage medium 200 from the multifunction peripheral 100, and brings the external storage medium 200 to the location of the terminal device 300, and connects the attachment unit 309 of the external storage medium 200 with the attachment port 315 of the terminal device 300 again. At this time, the control unit 401 of the terminal device 300 detects the attachment of the external storage medium 200 (FIG. 5: S107), and notices a decryption unit 406 of the attachment. Upon receipt of the notice, the decryption unit 406 obtains the identification information ("ABC") of the external storage medium 200 (FIG. 5: S108), refers to the table ("Table C") storing the identification information corresponding to the identification information ("ABC"), and decrypts the encrypted log by the secret key ("Secret key A") in the table (FIG. 5: S109).

In the present disclosure, the encrypted log can be decrypted only by the secret key corresponding to the public key. Therefore, it is the terminal device 300 that can decrypt the encrypted log, and this means that the password is managed only by the terminal device 300. As a result, the data security can be improved.

In addition, when the one-time keys are used as the public key and the secret key, only the external storage medium 200 connected first with the terminal device 300 can create the public key and the secret key, with a result that the data security can be more improved.

The present disclosure is configured that the encrypted log is not decrypted by the specific password that the user memorized, but it is decrypted by mans of the identification information of the external storage medium 200. Therefore, the user needs not to remember and manage the password, and it is possible to prevent from the leak of the log data because the passwords are managed carelessly.

Moreover, the system 1 is configured so as to store the public key in the external storage medium 200. Accordingly, even if the external storage medium 200 is lost, a new file and table can be created by connecting a new external storage medium with the terminal device 300 to communicate each other, and the external storage medium 200 for storing the log can be reconstructed easily. That is to say, it is possible to eliminate a following defect; it is necessary to register a new external storage medium on both the multifunction peripheral 100 and the terminal device 300 in the log storage method that allows both the multifunction peripheral 100 and the terminal device 300 to store the log, when the external storage medium 200 is lost. This operation is very troublesome.

As described above, the present disclosure can improve the security without managing the password for storing the log.

Second Embodiment of the Present Disclosure

Figure 7:
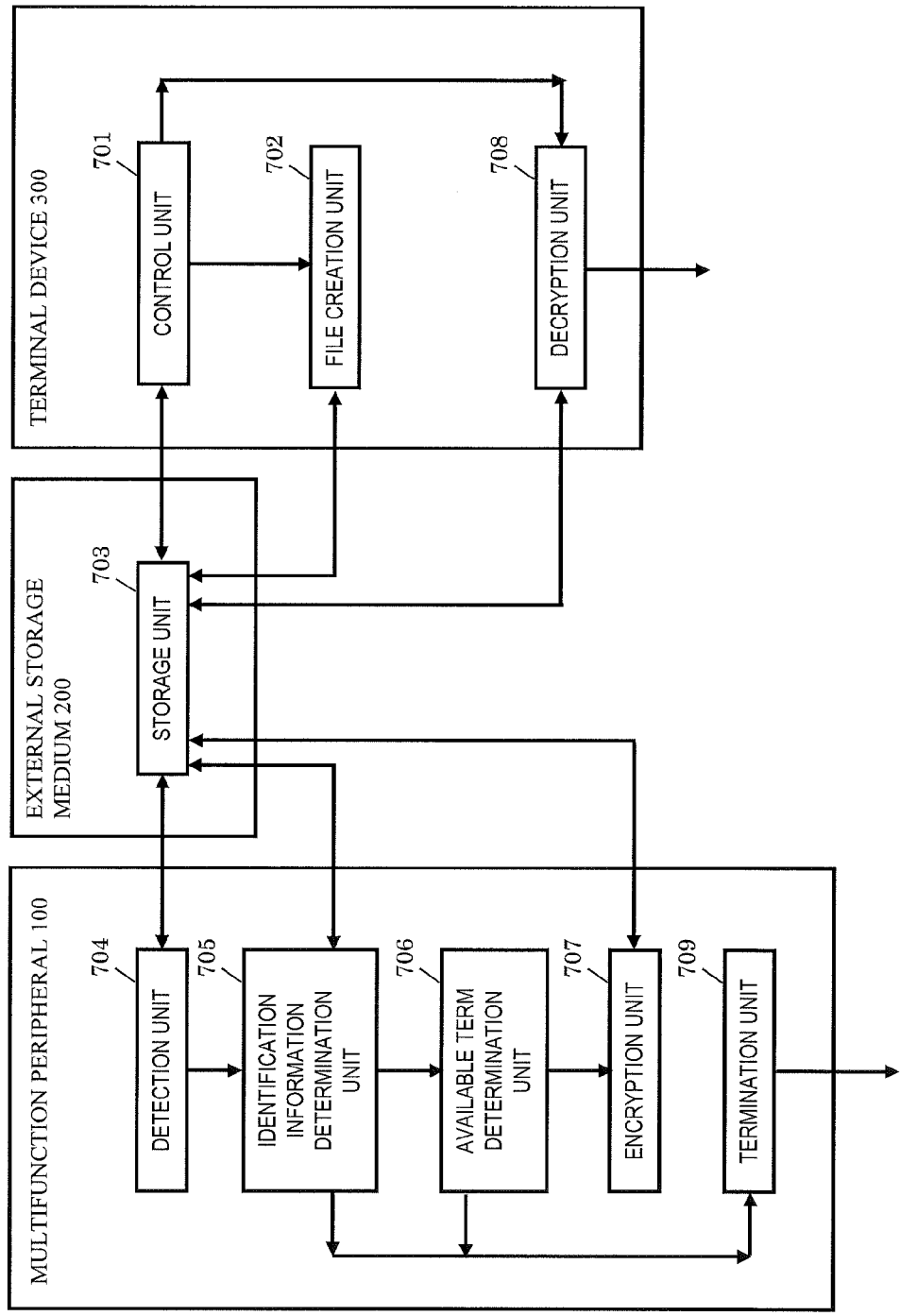
FIG. 7 is a function block diagram of the image processing system in accordance with second embodiment of the present disclosure.
Figure 8:
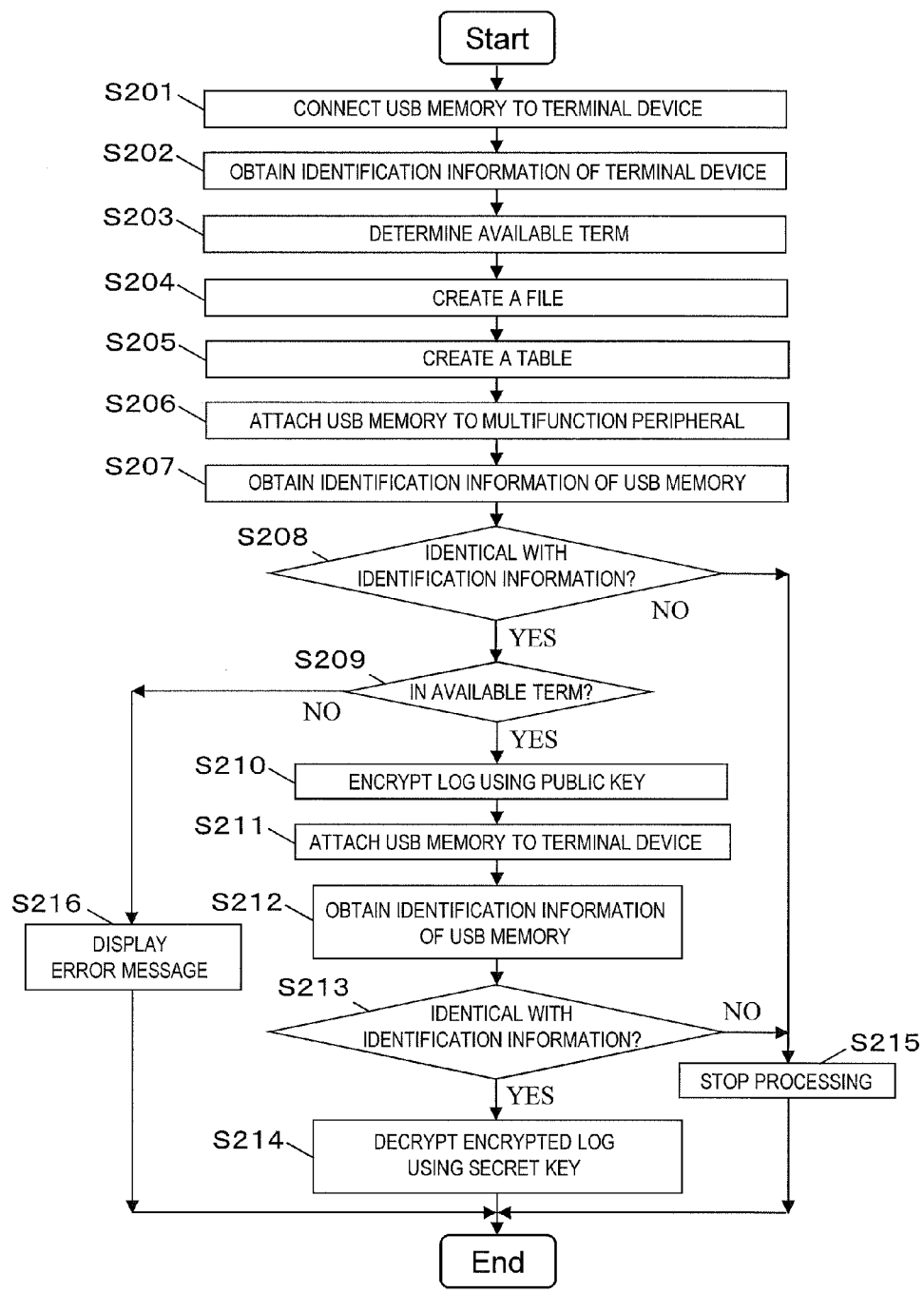
FIG. 8 is a flowchart indicating execution steps in accordance with second embodiment of the present disclosure.

With reference to FIG. 7 and FIG. 8, the configuration and execution procedure in second embodiment of the present disclosure are explained hereinafter.

Figure 9:
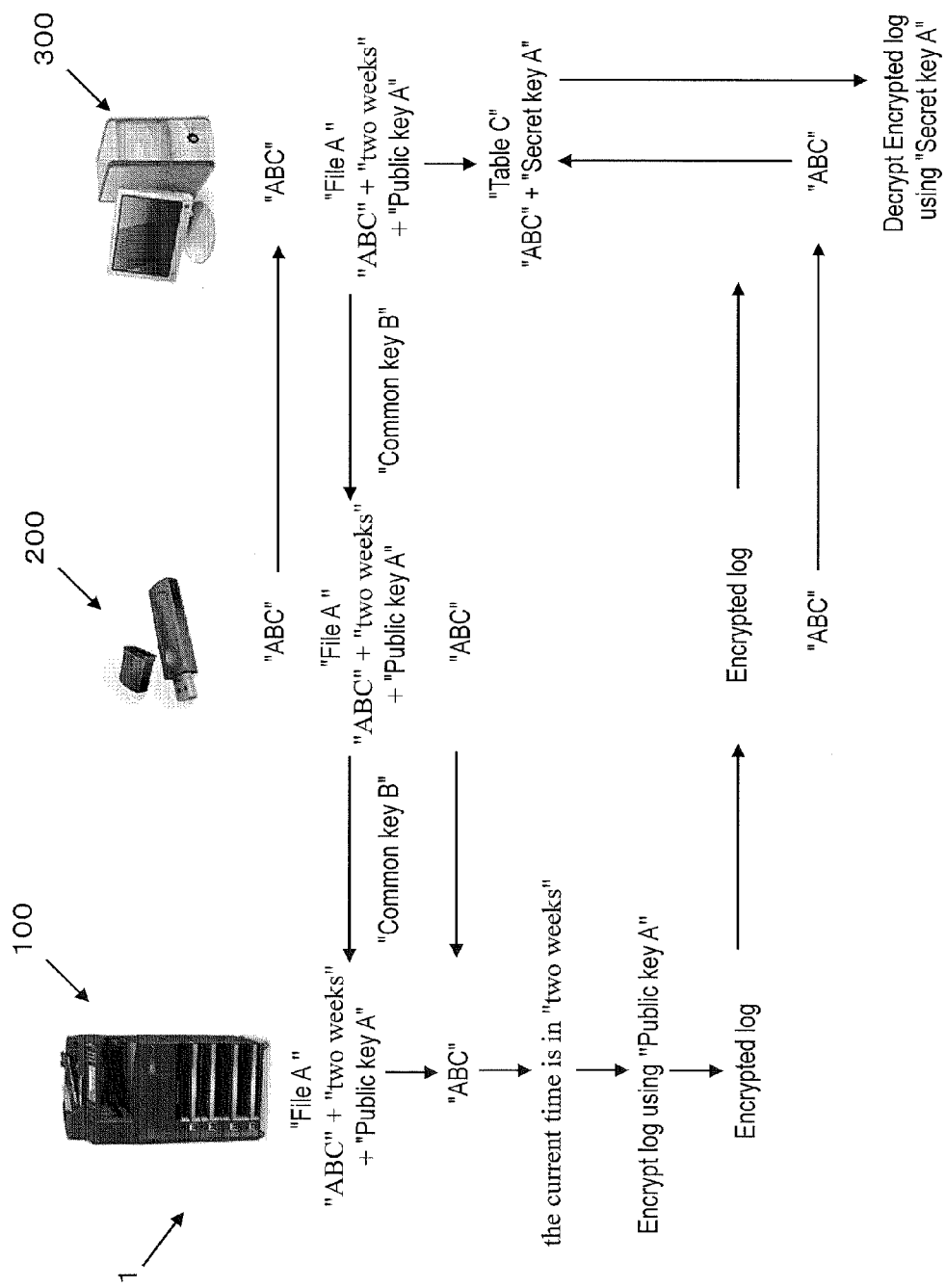
FIG. 9 is a conceptual diagram indicating data transaction of the image processing system in accordance with second embodiment of the present disclosure.

When the user connects the attachment unit 309 of the external storage medium 200 USB memory) with the attachment port 315 of the terminal device 300 that is located at the specific company, such as a head office or a development company, a control unit 701 of the terminal device 300 detects the connection of the external storage medium 200 (FIG. 8: S201), and notifies a file creation unit 702 of the connection. Upon receipt of the notice, the file creation unit 702 obtains identification information (e.g., "ABC") previously registered on the external storage medium 200, as shown in FIG. 9 (FIG. 8: S202), and determines an available term of the identification information to be used for the log storage (FIG. 8: S203).

The method of obtaining the identification information of the external storage medium 200 by the file creation unit 402 is not limited in particular. For instance, when the external storage medium 200 is physically connected with the external device 300, the file creation unit 402 obtains the identification information directly from the external storage medium 200. Otherwise, when the external storage medium 200 is not physically connected with the external device 300, namely, when the external storage medium 200 is connected with the terminal device 300 via network and the user's terminal device, the file creation unit 402 obtains the identification information from the external storage medium 200 via the user's terminal device and network. In addition, software may be created to obtain the identification. By means of the software, the user may fetch out the identification information of the external storage medium 200 from the external storage medium 200 at some place, and then input the fetched information to the terminal 300 manually.

The identification information of the external storage medium 200 can uniquely identify the external storage medium, such as a serial number, a production number, an individual number, maker name, and a model number. The available term is determined to a specific period (e.g. "two weeks") after the external storage medium 200 is attached (e.g. "2013 Nov. 6, 9:00") or after an under-mentioned file is stored in the external storage medium 200. The function of the available term will be described later.

A file creation unit 702 creates a file ("File A") associating the identification information ("ABC"), the available term ("two weeks") and the public key ("Public key A"), and store the file ("File A") in a storage unit 703 of the external storage medium 200 (FIG. 8: S204).

The public key may be an ordinary common key. Otherwise, the public key may be a key created in advance in the terminal device 300 or a one-time key created at first connecting the external storage medium 200 with the terminal device 300 like a one-time password. In case of the one-time key, the data security can be improved.

If the file can be a file associating the identification information, the available term and the public key, it is not limited in particular. It may be a simple table, or a file including programs corresponding to following respective units.

When the file creation unit 702 stores the file ("File A") in the storage unit 703 of the external storage medium 200, the file is encrypted by a common key ("Common key B") that is common to the terminal device 300 and the multifunction peripheral 100, and then the encrypted file is stored in the storage unit 703 of the external storage medium 200, whereby the data security can be more improved.

After creating and storing the file, the file creation unit 702 creates a table in which a secret key ("Secret key A") corresponding to the public key of the file is associated with the identification information, and then stores the table in the predetermined memory in the terminal device 300 (FIG. 8: S205).

At this time, the table is not limited in particular, but the table may associate the identification information with the secret key. The table may be a simple table, or a table including programs for the under-mentioned units. If the public key is an ordinary common key, the secret key of the table may be the common key.

Accordingly, the file ("File A") including the identification information that can uniquely identify the external storage medium 200 is stored in the external storage medium 200, and the table ("Table C") including the identification information of the external storage medium 200 is stored in the terminal device 300. Hereby, only the external storage medium 200 is ready for storing the log.

The user detaches the external storage medium 200 from the terminal device 300, and brings the external storage medium 200 to the location of the multifunction peripheral 100, and connects the attachment unit 309 of the external storage medium 200 with the attachment port 306 of the multifunction peripheral 100. At this time, a detection unit 704 of the multifunction peripheral 100 detects the attachment of the external storage medium 200 (FIG. 8: S206), confirms the attachment of the external storage medium 200 storing the file, and notifies an identification information determination unit 705 of the attachment. Upon receipt of the notice, the identification information determination unit 705 confirms that the file is stored in a storage unit 703 of the external storage medium 200, and obtains the identification information of the external storage medium 200 (FIG. 8: S207). The identification information determination unit 705 determines whether or not the identification information of the external storage medium 200 is identical with the identification information ("ABC") of the file (FIG. 8: S208).

When the identification information determination unit 705 executes the determination, if the file is encrypted by the common key ("Common key B"), the determination is executed by obtaining the identification information ("ABC") of the file after decrypting the file using the common key registered in advance on the multifunction peripheral 100.

Where the file creation unit 702 of the terminal device 300 encrypts the identification information ("ABC") using the public key, and then stores it in therein, the identification information determination unit 705 of the multifunction peripheral 100 may execute the determination by encrypting the identification information obtained from the external recording medium 200 using the public key and comparing both the encrypted identification information.

As a result of the determination, when the identification information of the external storage medium 200 is identical with the identification information ("ABC") of the file (FIG. 8: S208 YES), the identification information determination unit 705 notifies an available term determination unit 706 of the result. Upon receipt of the notice, the available term determination unit 706 obtains a current time from a clock provided to the multifunction peripheral 100, and determines whether or not the current time is in the available term (FIG. 8: S209).

When the available term determination unit 706 determines whether or not the current time is in the available term of the file, if the current time is 2013 Nov. 7, 9:00 and the available term is two weeks from 2013 Nov. 6, 9:00, it is determined that the current time is in or out the available term.

As a result of the determination, when the current time is in the available term (FIG. 8: S209 YES), the available term determination unit 706 notifies the encryption unit 707 of the result. Upon receipt of the notice, the encryption unit 707 encrypts the log of the multifunction peripheral 100 using the public key ("Public key A") of the file and then stores the encrypted log in the storage unit 703 of the external storage medium 200 (FIG. 8: S210).

The log of the multifunction peripheral 100 includes process information, failure information, internal information, bug information, customer information, the facsimile number, and the e-mail address, and so on o the multifunction peripheral.

Since the log is encrypted by the public key as above, if the user loses the external storage medium 200 storing the encrypted log on the way to the terminal device 300 and the other user finds the external storage medium 200 and decrypts the encrypted log therein, the other user cannot decrypt any data without the secret key of the external storage medium 200. Accordingly, if the user loses the external storage medium 200, the data security can be improved.

The determination of encrypting the log and storing them in the external storage medium is based on the identification information, so that only in the external storage medium 200 storing the file created by the terminal device 300 is allowed to store the encrypted log. Therefore, it is possible to efficiently prevent that the other user extracts and store the file from the external storage medium to the other storage medium. That is, it is possible to limit the number of the external storage medium 200 allowed to store the log.

The user detaches the external storage medium 200 from the multifunction peripheral 100, and brings the external storage medium 200 to the terminal device 300, and connects the attachment unit 309 of the external storage medium 200 with the attachment port 315 of the terminal device 300 again. At this time, the control unit 701 of the terminal device 300 detects the attachment of the external storage medium 200 (FIG. 8: S211), and confirms the attachment of the external storage medium 200 storing the encrypted log, and notices a decryption unit 708 of the attachment. Upon receipt of the notice, the decryption unit 708 obtains the identification information (e.g., "ABC") of the external storage medium 200 as shown in FIG. 9 (FIG. 8: S212), and determines whether or not the identification information ("ABC") of the external storage medium 200 is identical with the identification information of the table ("Table C") (FIG. 8: S213).

As a result of the determination, when the identification information ("ABC") of the external storage medium 200 is identical with the identification information of the table ("Table C") (FIG. 8: S213 YES), the decryption unit 708 decrypts the encrypted log using the secret key ("Secret key A") of the table ("Table C") storing the identical identification information ("ABC") (FIG. 8: S214).

The encrypted log cannot be decrypted by the external storage medium which is not the external storage medium 200 connected first with the terminal device 300. Accordingly, the encrypted log can be decrypted only by the terminal device 300. The password is managed only by the terminal device 300, even though the other terminal device 300' equivalent to the terminal device 300, it is not possible to perform the decryption without the secret key. As a result, the security can be improved further more.

In addition, it is possible to more improve the security by using the public key and the secret key. For instance, when the one-time keys are used as the public key and the secret key, since only the external storage medium 200 connected first with the terminal device 300 can create the public key and the secret key, the data security can be more improved.

The encryption and decryption of the log is not executed by the specific password memorized by the user, but it is executed by means of the identification information of the external storage medium 200. Therefore, the user needs not to remember and manage the password, and it is possible to definitely prevent the leak of the log due to the insufficient management of the passwords.

In addition, it is configured in this system 1 that the log is stored using the file and table including the identification of the external storage medium. Accordingly, if the external storage medium is lost, a new file and table can be created based on the identification information of a new external storage medium 200 by connecting the new external storage medium 200 with the terminal device 300. It is possible to easily implement the new external storage medium 200 to the multifunction peripheral for storing the log. This is able to eliminate a defect that, in the method that only the external storage medium 200 registered on both the multifunction peripheral 100 and the terminal device 300 is allowed to store the log, when the external storage medium 200 is lost, the new external storage medium 200 is to be registered on both the multifunction peripheral 100 and the terminal device 300, which is very troublesome.

In the present disclosure, the terminal device 300 creates the file using the identification information of the external device, 200, and the file includes the encryption key for encrypting the log by the external storage medium, so that the encryption and decryption of the log can be substantially managed by the terminal device 300. Therefore, it is possible to definitely prevent that the log including the customer's individual information is taken out through the external storage medium.

At the step S208, as a result of the determination, when the identification information of the external storage medium 200 is not identical with the identification information ("ABC") of the file A (FIG. 8: S208 NO), the identification information determination unit 705 notifies a termination unit 709 of the result. Upon receipt of the notice, the termination unit 709 stops the multifunction peripheral 100 (FIG. 8: S215). In this case, there is a possibility that the other user copies only the file to the other external storage medium excluding the external storage medium 200 and stores the log therein. Therefore, the action that the user attaches the external storage medium to the multifunction peripheral is considered as an illegal action, and the subsequent processing is terminated. Hereby, it is possible to improve the security. The termination unit 709 may be configured to give a warning or alarm, send the alarm to the terminal device of the management company through the network, or display the error screen on the touch panel 201.

At the step S213, as a result of the determination, when the identification information ("ABC") of the external storage medium 200 is not identical with the identification information of the table ("Table C") (FIG. 8: S213 NO), the decryption unit 708 displays, on a liquid crystal display of the terminal device, a message that the external storage medium is illegal, and terminates (FIG. 8: S217). Accordingly, it is possible to avoid that the other user copies only the encrypted log to the other external storage medium and decrypts the log.

Figure 10:
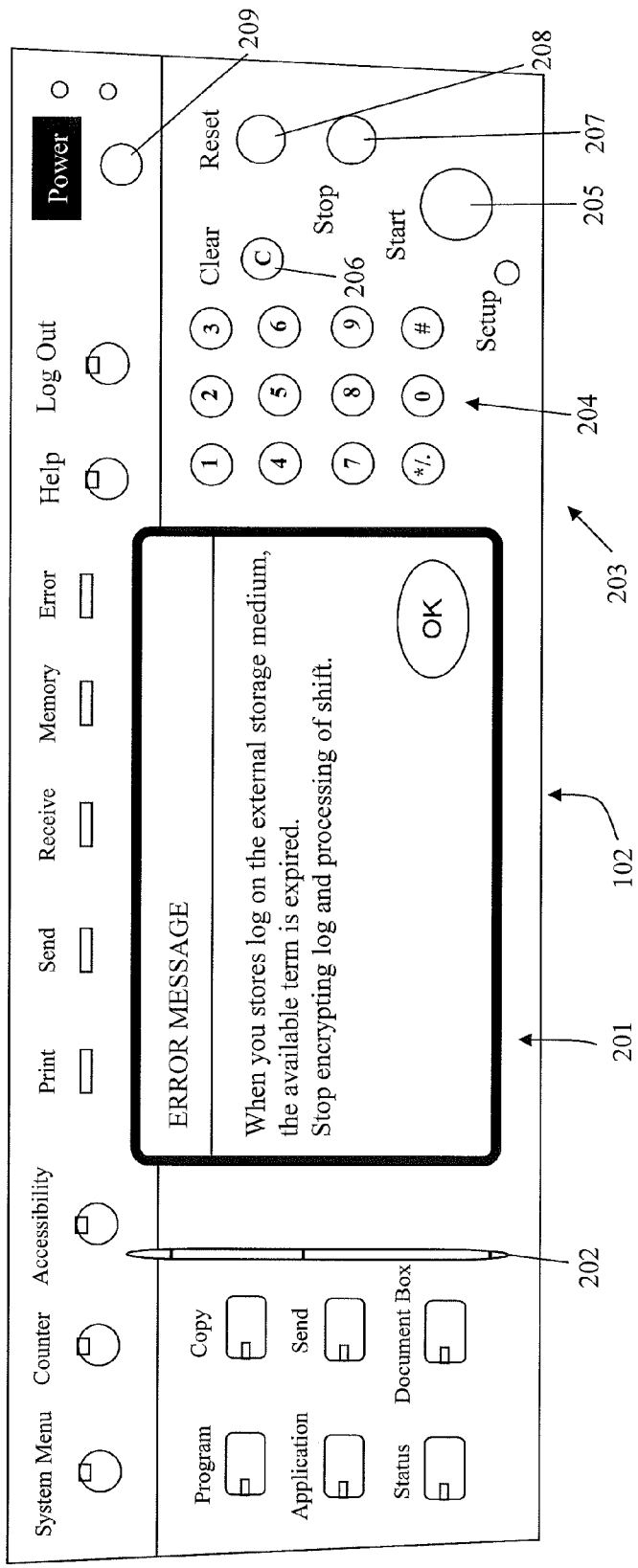
FIG. 10 is a conceptual diagram indicating a whole structure of an operation unit in accordance with second embodiment of the present disclosure.

At S209, as a result of the determination, when the current time is not in the available term (FIG. 8: S209 NO), the available term determination unit 706 notifies the termination unit 709 of the result. Upon receipt of the notice, the available term determination unit 706 displays, on the touch panel 201 of the operation unit 102, an error message that the available term is expired and the log cannot be stored, as shown in FIG. 10 (FIG. 8: S216). Accordingly, it is possible to control the available term for storing the log in the external storage medium, and improve the security.

When the available term is expired, the user goes back to S201, and store the new file in the external storage medium 200 by means of the terminal device 300, whereby it is possible to allow the external storage medium to store the log.

In the second embodiment of the disclosure, the available term is added to the identification information, but it is not necessary to set the available term, or the available term may be an unlimited term. Accordingly, the log storage becomes more convenient because the log can be taken out at any time In the present disclosure, the number of the external storage medium allowed to store the log is limited, and if necessary, the new external storage medium can be implanted to the multifunction peripheral in a simple manner.

In the first and second embodiments of the present disclosure, when the external storage medium 200 is mounted on the terminal device 300 or the multifunction peripheral 100, it is configured to execute the steps of the present disclosure. But the other configuration may be employed. That is, the steps may proceed to next after each screen for guiding the user is displayed in every step, or the key input by the user is received.

In the first and second embodiments of the present disclosure, the image processing system 1 is configured to include each unit, but it may be configured by providing with the storage medium storing the program realizing the respective units. In such configuration, the program is read onto the terminal device and the multifunction peripheral, and the terminal device and the multifunction peripheral realizes the respective units. In this case, the program read from the external storage medium can provide with the same effect as the present disclosure. In addition, it is possible to provide with the method for storing the steps executed by each unit in the hard disk.

What is claimed is:

1. An image processing system including a terminal device and an image processing apparatus that are connected and communicated with an external storage medium respectively, wherein:
   the terminal device comprises:
      a file creation unit operable to create a file including identification information of the external storage medium associated with a public key and store the file in the external storage medium, when the terminal device is connected with the external storage medium, and
      a decryption unit operable to decrypt an encrypted log using a secret key corresponding to the public key, when the terminal device is connected with the external storage medium storing the encrypted log; and
   the image processing apparatus comprises:
      an identification information determination unit operable to determine whether or not the identification information of the external storage medium is identical with the identification information in the file, when the image processing apparatus is connected with the external storage medium storing the file,
      an encryption unit operable to encrypt a log using the public key stored in the file of the external storage medium and store the encrypted log in the external storage medium, when it is determined that the identification information of the external storage medium is identical with the identification information in the file, and
      a termination unit operable to stop a use of the image processing apparatus when it is determined that the identification information of the external storage medium is not identical with the identification information in the file.

2. The image processing system according to claim 1, wherein
   the file creation unit creates a table associating the secret key with the identification information previously registered in the external storage medium and stores the table in a specific memory in the terminal device, when the terminal device is connected with the external storage medium, and
   the decryption unit refers to the table storing the identification information corresponding to the identification information of the external storage medium and decrypts the encrypted log using the secret key in the table, when the terminal device is reconnected with the external storage medium storing the encrypted log.

3. The image processing system according to claim 1, wherein
   the file creation encrypts the file using a common key common to the external storage medium and the terminal device and stores the encrypted file, when the terminal device is connected with the external storage medium, and
   the encryption unit, when the image processing apparatus is connected with the external storage medium storing the file encrypted by the common key, decrypts the encrypted file using the common key, obtains the public key, and executes the encryption.

4. The image processing system according to claim 1, wherein the public key and the secret key are one-time keys.

5. An image processing system according to claim 1, further comprising an available term determination unit in the image processing apparatus, wherein
   the file creation unit determines an available term for storing the log in the external storage medium, and stores a file including the identification information and the available term in the external storage medium,
   the available term determination unit determines whether or not a current time is in the available term when the identification information of the external storage medium is identical with the identification information in the file, and
   the encryption unit encrypts the log in the image processing apparatus when the current time is in the available term, and stores the encrypted log in the external storage medium.

6. The image processing system according to claim 1, wherein the termination unit stops the use of the image processing apparatus when the identification information of the external storage medium is not identical with the identification information in the file, and gives an alarm, sends the alarm to the terminal device, or displays an error message on a touch panel of the image processing apparatus.

7. The image processing system according to claim 2, further comprising a termination unit in the image processing apparatus, wherein
   the termination unit displays, on a liquid crystal display of the terminal device, a message that the external storage medium is illegal, and stops the image processing apparatus, when the identification information of the external storage medium is not identical with the identification information in the table.

8. A log storage method for an image processing system including a terminal device and an image processing apparatus that are connected and communicated with an external storage medium respectively, comprising steps of:

creating a file including identification information of the external storage medium associated with a public key and storing the file in the external storage medium, when the terminal device is connected with the external storage medium, using the terminal device;

determining whether or not the identification information of the external storage medium is identical with the identification information in the file, when the image processing apparatus is connected with the external storage medium storing the file, using the image processing apparatus;

encrypting a log using the public key stored in the file of the external storage medium and storing the encrypted log in the external storage medium, when it is determined that the identification information of the external storage medium is identical with the identification information in the file, using the image processing apparatus;

stopping a use of the image processing apparatus when it is determined that the identification information of the external storage medium is not identical with the identification information in the file, using the image processing apparatus; and decrypting the encrypted log using a secret key corresponding to the public key, when the terminal device is reconnected with the external storage medium storing the encrypted log, using the terminal device.

* * * * *